Aug. 29, 1944.   J. H. TURNER   2,357,148
TANK MOUNTING
Filed April 14, 1943
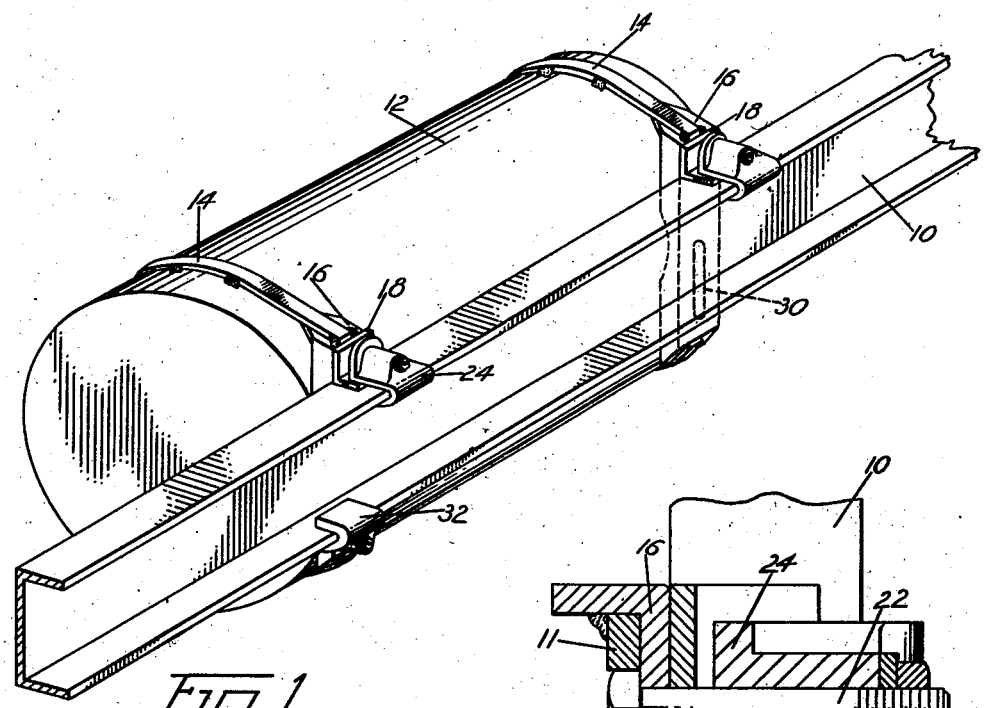
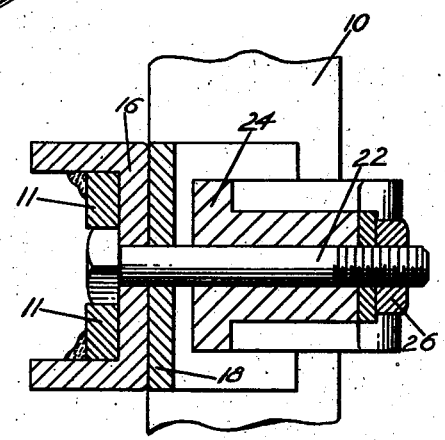
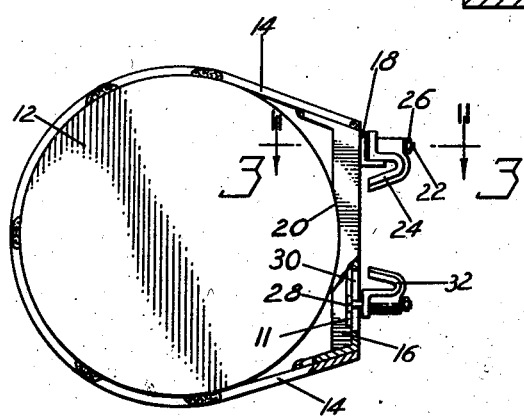
INVENTOR
James H. Turner
BY
*Parker & Burton*
ATTORNEYS Patented Aug. 29, 1944

2,357,148

UNITED STATES PATENT OFFICE 2,357,148

TANK MOUNTING

James H. Turner, Detroit, Mich., assignor to Allied Equipment Company, Detroit, Mich., a corporation of Michigan Application April 14, 1943, Serial No. 483,041

5 Claims. (Cl. 280—5)

This invention relates to an improved mounting or support for an auxiliary tank for a vehicle.

It is particularly adapted for use as a support for an auxiliary gas tank and is intended to be employed to secure the tank to the channel section side frame member of a motor vehicle, such as a motor truck.

An object is to provide a mounting or support for a tank of this character which is inexpensive as to cost, simple of construction, and is adapted for ease of attachment and detachment. A meritorious feature is that the construction of the mounting is such that the tank may be readily attached to side frame members of different size.

Another object is to provide a mounting whereby a tank may be secured in place without forming any holes in the frame member, which holes would tend to weaken the frame member. The mounting is such that the tank can be quickly clamped to the frame member without alteration thereof and with the use only of a wrench.

A further object is to provide an improved mounting for such a tank which mounting may be securely fastened to the tank to form a part thereof and is shiftable therewith so that the tank and the mounting may be moved as a unit from one vehicle to another for attachment.

Other objects, advantages, and meritorious features of this invention will more fully appear from the following description of pended claims and accompanying drawing.

Figure 1 is the perspective of a tank provided with my improved mounting showing attachment of the tank to a broken away portion of the standard channel section side frame member of a motor truck.

Figure 2 is an end elevation of a tank provided with my improved mounting secured thereto and ready for attachment to a vehicle frame.

Figure 3 is a cross sectional view taken on the line 3—3 of Figure 2.

In the drawing numeral 10 indicates the conventional channel section side frame member of a motor vehicle such as a truck which is adapted to be equipped with the tank 12. The tank is shown as of a cylindrical shape, but any desired shape of tank might be used. A pair of straps 14 are extended about the tank as shown in Figure 1. These straps may be welded or otherwise secured to the tank. Between the ends of each strap is mounted a channel section bracket element 16. The ends of each strap may be welded to the opposite ends of its bracket element permanently attaching the straps and brackets to the tank. Each bracket is channel shaped in cross section and the edges of its side flanges abut the tank. The bracket extends substantially tangentially between the ends of its strap.

Each bracket element 16 is provided with an outwardly projecting L-shaped part 18 welded or otherwise secured to the upper end of the bracket and adapted to seat upon the upper side flange of the frame member 10 as shown in Figure 1. The side flanges of each bracket may have a small arcuate cut out 20 adapted to conform slightly with the contour of the tank.

A bolt 22 extends through the bottom of the bracket and the L-shaped part 18 as shown in Figure 2. This bolt projects outwardly from the tank and over the upper side flange of the frame member. A U-shaped clamp 24 is adapted to be received upon bolt 22 as illustrated and is held thereon by a threaded nut 26 and lock washer as shown. This clamp is adapted to engage over the upper side flange of the frame member and to be drawn outwardly thereagainst by the threading of the nut upon the bolt. A bolt 28 extends through a slot 30 in the bottom of the bracket. This bolt projects away from the tank below the lower side flange of the frame member 10. This bolt carries a clamp element 32 which is similar to the clamp element 24. The clamp 32 is adapted to be received over the lower side flange of the frame as shown in Figure 1. The slot 30 is shown in the bracket at one end of Figure 1 in dotted outline. The clamp 32 is omitted to disclose the slot.

The bolts are of sufficient length to project beyond the side flange and to receive the clamps and nuts thereover. They are of sufficient length to permit a mounting of the device upon channel section side frame members having flanges of different widths. The bolt 28 is adjustable through the slot 30 toward and away from the bolt 22 to permit attachment of the mounting to side frame members of different widths.

The mounting may be permanently secured to the tank. The bolts would be inserted through the brackets and the brackets permanently attached to the tank by the straps as by soldering or welding or otherwise securing the same thereto. As shown in Figure 3 the bolt heads may be seated between abutments 11 formd on the inside of the bracket bottoms and serving to hold the bolts against rotation. A tank provided with such a mounting is adapted to be quickly attached to any conventional channel section side frame member of a motor vehicle. It is adapted to be readily removed and shifted to another vehicle. When attached it is securely held in position.

What I claim is:

1. Supporting mechanism for securing a tank to a vehicle frame member of channel cross section, comprising a pair of bracket elements secured to the tank, each bracket element provided with a pair of bolts projecting outwardly from the tank, one bolt of each pair projecting above the upper flange of the frame member and the other bolt of each pair projecting below the lower flange of the frame member, and a U-shaped clamp secured to each bolt and engaged over the adjacent flange of the frame member, one of the bolts of each pair being adjustable upon the bracket toward or away from the other bolt on the same bracket.

2. Mechanism for securing a tank to a vehicle frame member of channel cross section, comprising a pair of bracket elements secured to the tank, each bracket element provided with a pair of bolts projecting outwardly from the tank, one bolt of each pair projecting above the upper flange of the frame member and the other bolt of each pair projecting below the lower flange of the frame member, and a U-shaped clamp secured to each bolt and engaged over the adjacent flange of the frame member, each bracket provided with a slot within which one bolt of each pair is mounted for adjustment toward and away from the other bolt.

3. Mechanism for securing a tank to a vehicle frame member of channel cross section, comprising a pair of straps secured about said tank, a bracket associated with each strap and secured at opposite ends to opposite ends of the strap, said bracket being channel shaped in cross section and held by the strap with the edges of its side flanges abutting the tank, each bracket having a supporting part projecting outwardly near its upper end adapted to seat upon the upper side flange of the frame member, a bolt projecting outwardly from the tank through the bracket and said supporting part above the upper flange of the frame member, a clamp mounted on said bolt adapted to engage the upper side flange of the frame member, each bracket having a slot through its bottom, a second bolt mounted in the slot of each bracket and adjustable toward and away from the first bolt and adapted to project below the lower side flange of the frame member, a U-shaped clamp mounted upon the second bolt adapted to engage said flange.

4. Mechanism for attaching a tank to a vehicle frame member of channel cross section, comprising in combination with the tank, a pair of channel shaped bracket elements, each bracket element having a strap secured to the ends thereof and extending about the tank securing the bracket element to the tank with the side walls of the channel of the bracket against the tank, each bracket having a part projecting from the side opposite to the channel walls adapted to seat upon the upper side flange of the frame member, a bolt carried by the bracket extending outwardly through said part over said flange, securing means carried by the bolt engaging said flange, a second bolt projecting outwardly from said bracket below the lower flange of the frame member and means secured to the bolt engaging said flange, said second bolt being adjustable with respect to the bracket toward and away from the first bolt.

5. In combination with a channel frame member, a cylindrical tank, a pair of straps secured about the tank, a bracket associated with each strap and secured at opposite ends to opposite ends of the strap and held by the strap against the tank, and a frame engaging clamp adjustably secured to each end of each bracket projecting outwardly therefrom away from the tank adapted to engage over the flange of the channel frame member, one of said clamps being adjustable along the bracket toward and away from the other clamp.

JAMES H. TURNER.